(12) United States Patent
Wang et al.

(10) Patent No.: US 11,673,591 B2
(45) Date of Patent: Jun. 13, 2023

(54) CHILDREN'S PULL WAGON

(71) Applicant: Ningbo Matrix Trading Co., Ltd., Ningbo (CN)

(72) Inventors: Wenjie Wang, Shanghai (CN); Zhengming He, Shanghai (CN); Libo Song, Ningbo (CN)

(73) Assignee: NINGBO MATRIX TRADING CO., LTD., Ningbo (CN)

( * ) Notice: Subject to any disclaimer, the term of this patent is extended or adjusted under 35 U.S.C. 154(b) by 0 days.

(21) Appl. No.: 17/361,361

(22) Filed: Jun. 29, 2021

(65) Prior Publication Data

US 2021/0403064 A1 Dec. 30, 2021

(30) Foreign Application Priority Data

Jun. 29, 2020 (CN) .......................... 202021237135.7
Oct. 29, 2020 (CN) .......................... 202022451430.9

(51) Int. Cl.
*B62B 3/02* (2006.01)
*B62B 3/00* (2006.01)

(52) U.S. Cl.
CPC .............. *B62B 3/022* (2013.01); *B62B 3/001* (2013.01); *B62B 3/007* (2013.01)

(58) Field of Classification Search
CPC ......... B62B 3/022; B62B 3/001; B62B 3/007; B62B 5/065; B62B 5/067
See application file for complete search history.

(56) References Cited

U.S. PATENT DOCUMENTS

| | | | | |
|---|---|---|---|---|
| 949,774 | A * | 2/1910 | Minnich | B62B 3/001 280/47.11 |
| 10,435,055 | B1 * | 10/2019 | Zhu | B62B 3/007 |
| 10,953,903 | B1 * | 3/2021 | Park | B62B 3/007 |
| 10,953,904 | B1 * | 3/2021 | Sun | B62B 3/002 |
| 10,988,153 | B1 * | 4/2021 | Horowitz | B62B 7/008 |
| 2004/0164512 | A1 * | 8/2004 | Gunter | B62B 3/001 280/87.021 |
| 2007/0085285 | A1 * | 4/2007 | Lindsay | B62B 3/001 280/47.34 |
| 2008/0217886 | A1 * | 9/2008 | Poppinga | B62B 3/12 280/651 |
| 2010/0090444 | A1 * | 4/2010 | Chen | B62B 3/106 280/651 |
| 2010/0264625 | A1 * | 10/2010 | Zhu | B62B 3/007 280/444 |

(Continued)

FOREIGN PATENT DOCUMENTS

| | | | | |
|---|---|---|---|---|
| EP | 2151365 A1 * | 2/2010 | ............. | B62B 3/007 |
| EP | 2837544 A1 * | 2/2015 | ............. | B62B 3/007 |

*Primary Examiner* — James A Shriver, II
*Assistant Examiner* — Ian Bryce Shelton
(74) *Attorney, Agent, or Firm* — WPAT Law, P.C.; Anthony King

(57) ABSTRACT

A collapsible children's pull wagon having four wheels and an upper loop frame pivotably attached to a lower loop frame. There is a hub to which a pull bar and a front axle is coupled to. The front axle is capable of rotating along a vertical axis of the hub in order to change the direction of travel. The pull wagon can easily collapse by releasing a support frame which directly connects the rear end of the upper loop frame to the rear end of the lower loop frame.

15 Claims, 8 Drawing Sheets

(56) References Cited

U.S. PATENT DOCUMENTS

| | | | | |
|---|---|---|---|---|
| 2015/0035258 A1* | 2/2015 | Chen | ............... | B62B 3/007 |
| | | | | 280/651 |
| 2015/0274186 A1* | 10/2015 | Treadwell | ............... | B62B 3/007 |
| | | | | 280/651 |
| 2017/0021850 A1* | 1/2017 | Bowman | ............... | B62B 3/007 |
| 2020/0283046 A1* | 9/2020 | Wu | ............... | B62B 3/007 |
| 2021/0107548 A1* | 4/2021 | Wang | ............... | B62B 3/007 |
| 2021/0114643 A1* | 4/2021 | Sun | ............... | B62B 5/067 |
| 2021/0300450 A1* | 9/2021 | Yang | ............... | B62B 5/067 |

* cited by examiner

CHILDREN'S PULL WAGON

CROSS-REFERENCE TO RELATED APPLICATIONS

This application claims priority to Chinese Patent Application No. 2020212371357, filed on Jun. 29, 2020, now pending, and claims priority to Chinese Patent Application No. 2020224514309, filed on Oct. 29, 2020, both of which are hereby incorporated by reference in their entireties.

FIELD OF THE DISCLOSURE

The present disclosure relates to a pull wagon and, more particularly, a collapsible pull wagon for children.

BACKGROUND OF THE DISCLOSURE

Generally, wagons of various sizes and uses are known.

There is a continuing need for wagons that are simple in construction and easy to stow away. There is also an apparent need for wagons with wheels that can be steered. Further, there may exist a need for wagons that can be handled by children to store and transport toys and is safe for children.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned needs. Although the present embodiments may obviate one or more of the above-mentioned needs, it should be understood that some aspects of the embodiments might not necessarily obviate them.

BRIEF SUMMARY OF THE DISCLOSURE

In a general implementation, a pull wagon includes an upper frame pivotably coupled to a lower frame.

In an aspect combinable with the general implementation, there can be a support frame disposed at or near the rear end of the pull wagon to prop up the upper frame thereby forming an expanded configuration of the pull wagon.

In another aspect combinable with the general implementation, the support frame is pivotably coupled to or near the rear end of the upper frame.

In another aspect combinable with the general implementation, there can be a platform fixedly disposed on the lower frame.

In another aspect combinable with the general implementation, the support frame can be releasably coupled to a portion of the lower frame, or releasably coupled to the platform of the lower frame, once released, the upper frame can fold onto the lower frame thereby creating a collapsed configuration.

In another aspect combinable with the general implementation, the support frame has a U-shape and can clip onto the platform via clippers disposed on the platform.

In another aspect combinable with the general implementation, the upper frame is a loop.

In another aspect combinable with the general implementation, the lower frame is a loop.

In another aspect combinable with the general implementation, the main structure of the pull wagon consists of two loops pivotably connected at their front ends and can be readily propped up into an expanded configuration by the support frame at or near the rear end of the loops.

In another aspect combinable with the general implementation, there can be a hub at the front end of the pull wagon. The hub includes a steering mechanism having a pull bar with a handle.

In another aspect combinable with the general implementation, the pull bar has a telescoping property allowing it to shorten or lengthen.

In another aspect combinable with the general implementation, the pull bar is pivotably connected to the hub via a joint that is extended forward beyond the front axle and the hub.

In another aspect combinable with the general implementation, the steering mechanism has a rotating body coupled to a front axle of the pull wagon, thereby allowing the front axle to turn left and right.

In another aspect combinable with the general implementation, the front axle is connected to two front wheel. There can be a rear axle connected to two rear wheels.

Accordingly, the present disclosure is directed to a pull wagon having a simple construction using two loops of frame pivotably connected to each other and may be propped into an expanded configuration using a U-shaped support frame.

While this specification contains many specific implementation details, these should not be construed as limitations on the scope of any inventions or of what may be claimed, but rather as descriptions of features specific to particular implementations of the disclosures.

Certain features that are described in this specification in the context of separate implementations can also be implemented in combination in a single implementation. Conversely, various features that are described in the context of a single implementation can also be implemented in multiple implementations separately or in any suitable subcombination.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
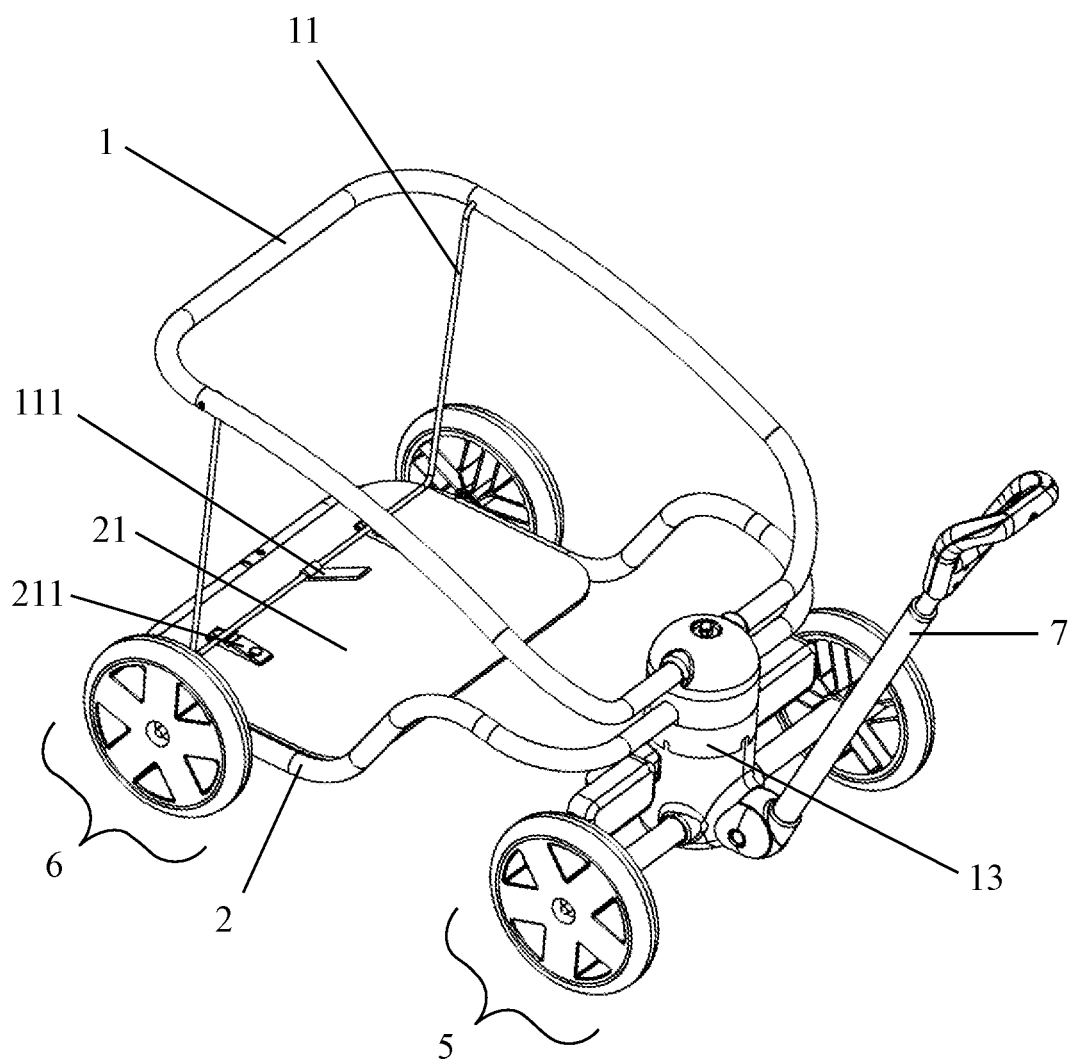
FIG. 1 is a perspective view of an embodiment of a pull wagon having a pivoting top frame connected at a front hub, according to an aspect of the disclosure.

The following call-out list of elements in the drawing can be a useful guide when referencing the elements of the drawing figures:

1—Upper frame
11—U-Shaped support frame
111—Pull tab
2—Lower frame
21—Platform
211—Fastener
13—Hub having a steering mechanism
131—Cap
1311—Second receiving grove
1312—Screw
132—Mid-body
1321—First receiving grove
1322—Sliding pillar
1323—Third receiving grove
133—Rotator
1331—Track body
13311—Sliding track
1332—Rotator body
13321—Top side of rotator body
1333—Joint
13331—Head portion
13332—Neck portion
4—Vertical axle
41 Screw
5—Front wheel parts
51—Front axle
52—Front wheel
6—Rear wheel parts
61—Rear axle
62—Rear wheel
7—Pull bar
71—Pull handle

DETAILED DESCRIPTION OF THE EMBODIMENTS

The different aspects of the various embodiments can now be better understood by turning to the following detailed description of the embodiments, which are presented as illustrated examples of the embodiments as defined in the claims. It is expressly understood that the embodiments as defined by the claims may be broader than the illustrated embodiments described below. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates.

The inventors have discovered a simplified construction for a children's pull wagon that can require minimum number of parts and can be easily collapsible and can easily turn into an expanded configuration.

Referring now to FIG. 1, the pull wagon generally includes an upper frame 1, a lower frame 2, a hub 13, front wheels 5, rear wheels 6, and a pull bar 7. The upper frame 1 has a front end that can be pivotably connected to the hub 13, and the lower frame 2 has a front end that can be connected to the hub 13. In some embodiments, the lower frame 2 does not pivot relative to the hub 13. The rear wheels 6 can be coupled to the lower frame 2 near or at the rear end of the lower frame 2. The front wheels 5 can be coupled to the bottom portion of the hub 13. As will be described in more details later, the front wheels 5 can be steered to change a direction of travel.

In some embodiments, the upper frame 1 can have a generally loop shape but is not limited thereto. In some contemplated embodiments, the upper frame 1 can form a rectangular loop that defines the upper perimeter of the wagon. A canvas cover (not shown) can be installed/attached onto this loop-shaped upper frame 1, and the loop-shaped upper frame can prop up the canvas cover to define the upper limit of the wall of an enclosure to hold toys and other items therein.

As used herein, the term "enclosure" in conjunction with the upper frame 1 and lower frame 2 refers to the interior of the wagon to store and hold any items of interest, such as toys. Enclosure can also refer to the interior space of any flexible cover that can be attached to the upper frame 1 and lower frame 2. A typical wagon has an enclosure defined by walls. Here, the wall can be made of a flexible cover (not shown), such as a canvas cover. This flexible cover can be tethered or somehow fixed to the upper frame 1 and lower frame 2. Upper frame 1 and lower frame 2 can function as a framework to prop up the canvas cover, thereby creating an enclosure defined by walls.

Figure 7:
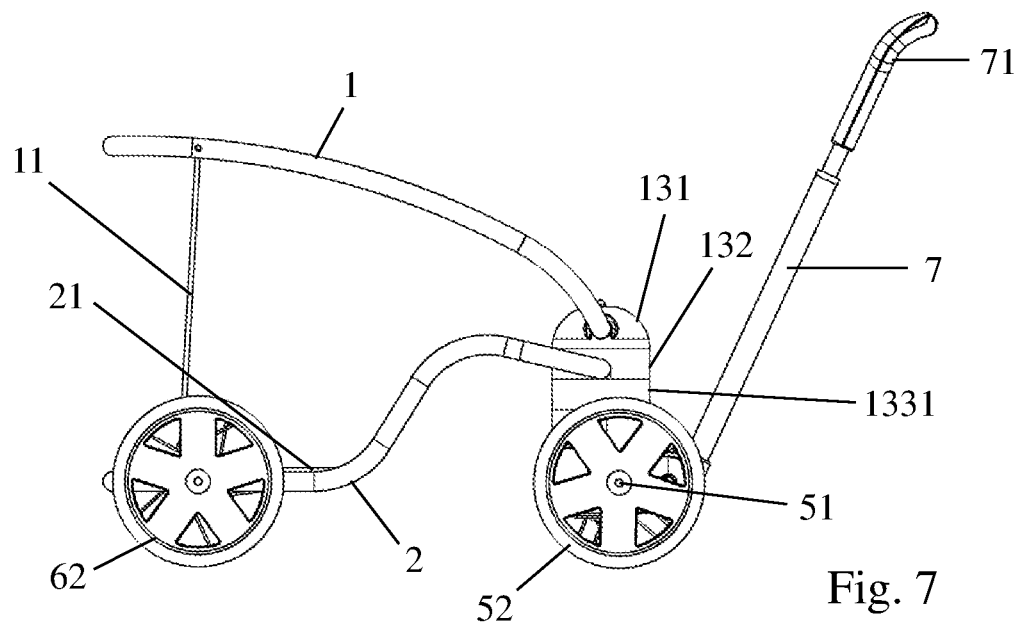
FIG. 7 is a side view of the pull wagon of FIG. 1, according to an aspect of the disclosure.
Figure 8A:
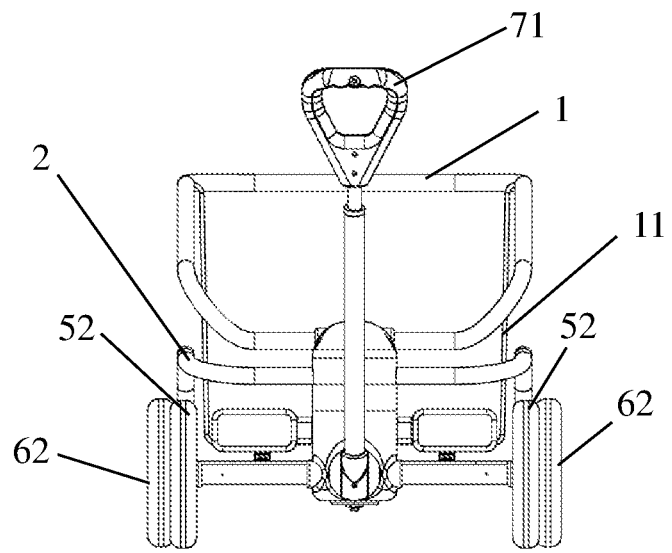
FIG. 8A is a front view of the pull wagon of FIG. 1, according to an aspect of the disclosure.
Figure 8B:
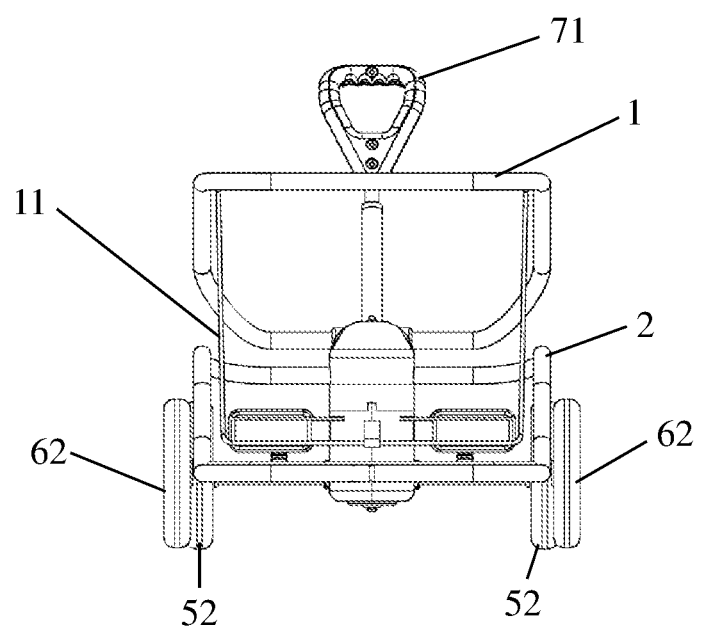
FIG. 8B is a rear view of the pull wagon of FIG. 1, according to an aspect of the disclosure.
Figure 8C:
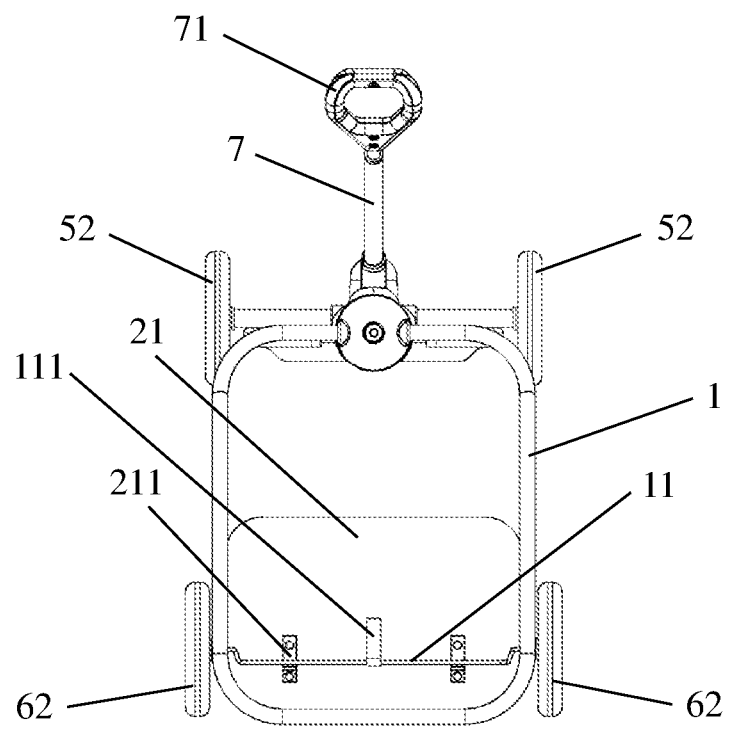
FIG. 8C is a top view of the pull wagon of FIG. 1, according to an aspect of the disclosure.
Figure 8D:
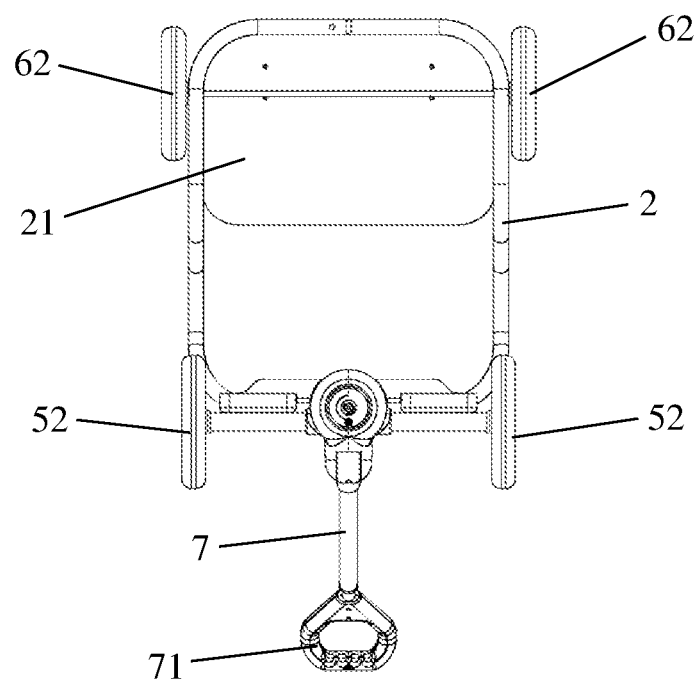
FIG. 8D is a bottom view of the pull wagon of FIG. 1, according to an aspect of the disclosure.

In an expanded configuration as shown in FIG. 1, the walls of the enclosure can be higher at the rear end of the wagon and the wall gradually lowers towards the front of the wagon. A side view of the expanded configuration shown in FIG. 7 illustrates one embodiment where the side wall height as defined by the upper frame 1 tapers lower towards the hub 13. The back wall of the enclosure can have a height that is taller than all other sides of the enclosure walls. The front wall of the enclosure can be the shortest wall of the enclosure.

In some embodiments, the canvas cover can have the general shape of a bag with a bottom. This bottom is contemplated to have no openings. In such embodiments, the entire bottom of the enclosure is covered with the canvas cover. In other embodiments, this bottom of the canvas cover can have an opening.

One of ordinary skill in the art would immediately recognize that any pliable and/or flexible materials other can canvas may be used as a cover to hold items of interest within the wagon.

In some embodiments, the lower frame 2 can have a generally loop-shape as shown in FIG. 1 but is not limited thereto. The loop-shaped lower frame 2 can be stabilized at three locations, that is, at the hub 13 and at the two rear wheels 6. In other embodiments, the loop-shaped lower frame 2 is only supported/stabilized at these three locations, that is, a load carried by the loop-shaped lower frame 2 and the enclosure is not supported at any other points of the loop.

In some other embodiments, the front half end of the loop-shaped lower frame 2 is only supported at the lower frame's 2 connection point with the hub 13.

In one aspect of the embodiments, there can be a platform 21 fixed to the lower frame 2. In one embodiment, the platform 21 can be a board with an area that occupies substantially the rear half of the looped-in space of the lower frame 2. Although a solid board is shown in FIG. 1, other suitable constructions are particularly contemplated. For example, the platform 21 can be a series of parallel slats, parallel bars, a net, etc. In this particular embodiment shown in FIG. 1, the front half of the looped-in space of the lower frame 2 is not covered by the platform 21 and remains open. This open area can be covered by the canvas cover (not shown) propped up by the framework of upper frame 1 and upper frame 2.

When the canvas cover (not shown) is removed from the wagon, the upper frame 1 can have a freedom of pivoting movement about its connection at the hub 13. This freedom of pivoting movement can be hindered by a releasable support frame 11. In some embodiments, when the canvas cover is not present, the upper frame 1 is only physically connected to the hub 13 and to the releasable support frame 11. That is, there can be no other framing structure attached to the upper frame 1 in some particular designs.

The upper frame 1 can be propped up with a releasable support frame 11. In the embodiment shown in FIG. 1, the releasable support frame 11 can have a generally U shape, but it is not limited thereto. For example, the U-shape releasable support frame 11 can be replaced by two separate support frames each of which is pivotably attached to the upper frame 1 and releasably attached to the platform 21 or to the lower frame 2.

The releasable support frame 11 can be made of any material and have any size and thickness. In one embodiment, the releasable support frame 11 can be a metal bar that is substantially thinner than the thickness of the upper frame 1 and the lower frame 2. The upper frame 1 and the lower frame 2, in comparison, can have a much thicker profile and can be made of hollow metal tubes.

In the embodiment shown, the releasable support frame 11 can be pivotably connected to the upper frame 1. In some embodiments, the U-shape releasable support frame 11 is connected to the upper frame 1 at or near the rear end of the upper frame 1.

In some embodiments, the upper part of the U-shape releasable support frame cannot be readily released from the upper frame 1. The lower part of the U-shape releasable support frame, however, can have pull tab 111 thereby allowing a user to pull the lower part of the U-shape releasable support in a forward direction. When the pull tab 111 is pulled forward, the lower part of the U-shape releasable support can be released from a fastener 211. The use of a pull tab 111 is optional, and there can be a design where no pull tab 111 is necessarily present.

The fastener 211 can be any suitable type of fasteners to provide a quick release, such as a hook, a clip, a groove, a catch, a clamp, etc. The fastener 211 can be fixedly attached to the top surface of the platform. In other embodiments, the fastener 211 can be fixedly attached to the lower frame 2.

When the releasable support 11 is released from the platform 21, the upper frame 1 can pivot downward onto the lower frame 2, thereby forming a collapsed configuration.

One way of implementing the support frame 11 have been described. Nevertheless, it will be understood that various modifications may be made without departing from the spirit and scope of the disclosure. Accordingly, other implementations are also contemplated. For example, an upside-down U-shape may work. That is, the lower part of the U-shape releasable support frame cannot be readily released from the platform 21. Instead, the upper part of the U-shape releasable support frame can be releasably attached to the upper frame 1 (not show). One of ordinary skill in the art can recognize that suitable fasteners can be used to detachably couple the upper part of the U-shaped support frame 11 to the rear or near-rear end of the upper frame 1. Similarly, there can be some kind of pull tab 211 to thereby allow a user to pull the upper part of the U-shape releasable support 11 in a forward direction.

Figure 2:
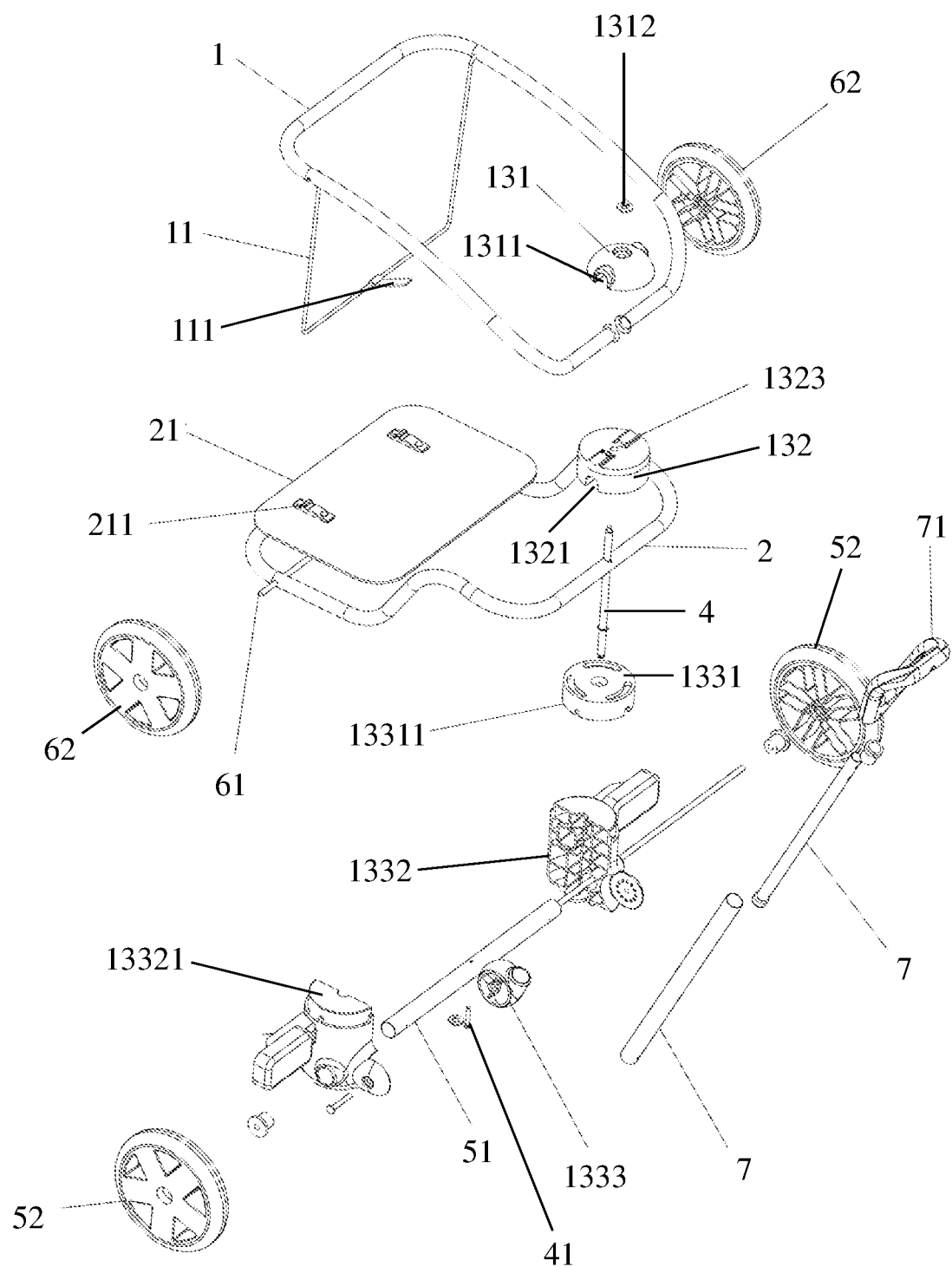
FIG. 2 is an exploded view of the pull wagon of FIG. 1, according to an aspect of the disclosure.

Referring now to FIG. 2, the upper frame 1 can have a generally rectangular loop shape from a top view. The loop can be interrupted at the front end where the upper frame 1 can connect with the hub 13. The hub 13 can have a cap 131 fixedly attached to a mid-body 132. The upper side of the mid-body 132 can have two receiving grooves 1323 to pivotably receive the interrupted region of the upper frame 1. The underside of the cap 131 can have corresponding receiving grooves 1311 to pivotably receive the interrupted region of the upper frame 1. A screw 1312 can be used to fasten the cap 131 onto the mid-body 132.

As shown in FIG. 2, the interrupted region of the upper frame 1 represents two terminal end of the loop of upper frame 1. Each of these terminal ends can have a flared tip to fit within a corresponding shape in the receiving grooves 1311, 1323. In this way, once the terminal ends are received into the grooves 1311, 1323 and the cap 131 is fastened onto the mid-body 132, these terminal ends are prevented from sliding out in a lateral direction.

When the cap 131 is fastened onto the mid-body 132, sufficient clearance is provided such that the terminal ends are not crimped within the receiving grooves 1311, 1323. The clearance allows the terminal ends to freely rotate within the receiving grooves 1311, 1323.

In other contemplated embodiments, the loop of upper frame 1 can be a closed loop. That is, there can be no interruption region and it can be a continuous loop. One skilled in the art would immediately recognize that there can be other corresponding shapes, rings, indents, that can be provided in contact surfaces between the receiving grooves 1311, 1312 and the upper frame 1 to prevent the upper frame from any undesired later movement without restricting its pivoting movement.

The lower frame 2 can have a generally rectangular loop shape from a top view. In the embodiment shown in FIG. 2, the lower frame 2 can be of a continuous, uninterrupted loop. At or near the rear end of the lower frame 2 there can be provided a pair of matching horizontal through holes to receive the rear axle 61. The rear axle 61 has two terminal ends each of which can be attached to a rear wheel 62. When the platform 21 is installed unto the rear half of the looped-in area of the lower frame 2, the platform 21 represents the floor of the enclosure. In this particular design, the rear axle 61 is at a vertical height (i.e., distance to the floor) substantially equal the vertical height of the floor of the enclosure. In other words, the floor of the enclosure can have a rather lower profile such that at least a portion of the floor is at the vertical height of the rear axle 61.

As shown in FIGS. 2 and 7, the front half of the looped-in area of the lower frame 2 can have a vertical height that is higher than the vertical height of the rear axle 61. In some embodiments, the front half of the looped-in area of the lower frame 2 can have a vertical height that is higher than the entire front wheel. In some other embodiments, the lower frame 2 can be connected to the hub 13 at a location having a vertical height that is higher than the front axle 51. In still other embodiments, the lower frame 2 can be connected to the hub 13 at a location having a vertical height that is higher than the entire front wheel 52. In other embodiments, the front wheels 52 and the rear wheel 62 have substantially the same diameter but is not limited thereto. In some embodiments, the front axle 51 and the rear axle 61 have substantially the same vertical height from the floor but is not limited thereto.

The front end of the lower frame 2 can be received within the receiving grove 1321

The front end of the lower frame 2 can have a vertical through hole to receive a vertical axle 4. The vertical axle connects the cap 131, the mid-body 132, the track body 1331, and the rotator body 1332. There can be a screw 1312 fastened to the top terminal end of the vertical axle 4 to keep the cap 1323 in place. There can be a screw 41 fastened to the bottom terminal end of the vertical axle 4 to keep the rotator body 1332 assembled to the rest of parts (131, 132, 1331) of the hub 13.

As will be described in more details later, the track body 1331 and the rotator body 1332 can rotate about the vertical axle 4. In some embodiments, the front axle 51 is disposed through the rotator body 1332, therefore, then the track body 1331 and the rotator body 1332 rotate, the front axle 51 also moves along.

In other embodiments, there can be no vertical axle 4. Other mechanical means and structural designs can be had to keep the various parts (131, 132, 1331, 1332) stacked together.

The top side of the track body 1331 can have arcuate sliding tracks 13311 to slidingly receive the sliding pillars 1322 (see FIG. 3) extending from the underside of the mid-body 132. These arcuate sliding tracks 13311 can limit the angle of travel. In some embodiments, this limits the angle of travel to between zero and 35 degrees but is not limited thereto. In some embodiments, this limits the angle of travel to between zero and 45 degrees but is not limited thereto. In some embodiments, this limits the angle of travel to between zero and 65 degrees but is not limited thereto. It should be understood that the above-described angles are exemplary and any other angles/coverage rates can be adopted in various embodiments of this disclosure.

The rotator body 1332 can have a top side 13321 (see FIG. 2) that nestles within the bottom (see FIG. 3) of the track body 1331. In this way, the rotator body 1332 can partially receive within the track body 1331. There may be corresponding shapes along their edges to prevent the track body 1331 from rotating relative to the rotator body 1332.

The pull bar 7 can have its lower end attached to a joint 1333. It is important to appreciate that although the present embodiment is particularly well suited for use by children, the contemplated wagon can be suitable for adults as well. Pull bar 7 can have a telescoping property, comprising an inner bar (see FIG. 2) and an outer bar within which the inner bar is slidably received. The telescoping property allows users of various height to conveniently use the handle 71. The handle 71 is fixedly attached to the upper terminal end of the inner pull bar 7.

Figure 3:
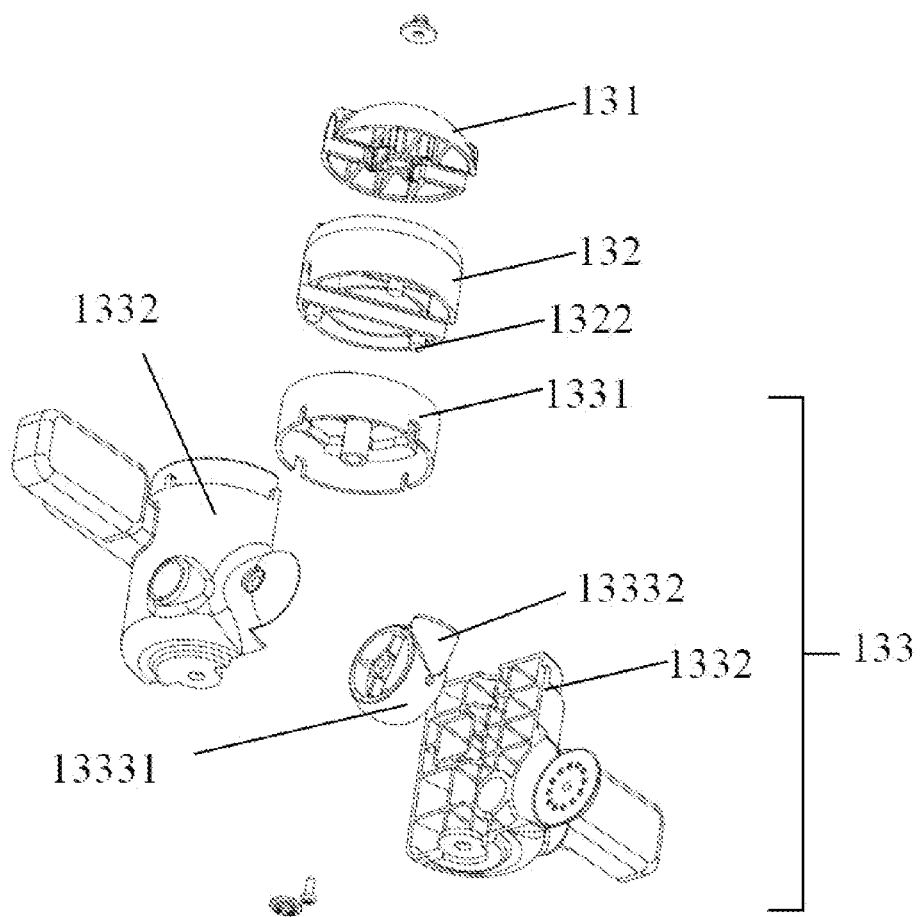
FIG. 3 is an exploded view of the steering mechanism, according to an aspect of the disclosure.

The joint 1333 can have a head portion 13331 and a neck portion 13332 (see FIG. 3). The joint 1333 can be pivotably attached to the rotator body 1332. In some embodiments, there can be teeth or a series of indents on contact surfaces between the joint 1333 and the rotator body 1332. In this way, the range of pivoting movement of the joint 1333 can be "clicked" into various positions, thereby allowing the handle bar 7 to remain in a particular position when the user lets his/her hand off the bar handle 71.

Referring now to FIG. 3, cap 131 and mid-body 132 do not rotate relative to each other. Mid-body 132 and the various parts included in the rotator 133 do rotate relative to each other.

Figure 4:
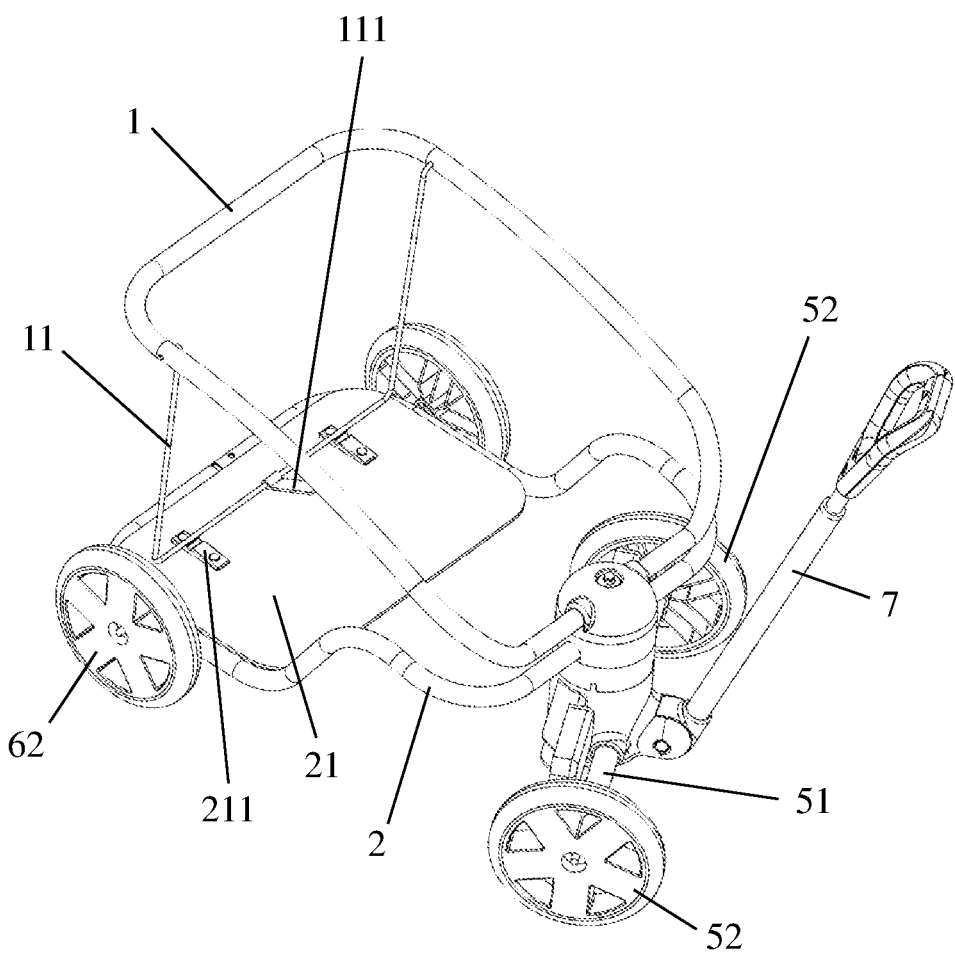
FIG. 4 is a perspective view of an embodiment of the pull wagon of FIG. 1 with the front axle turn towards left, according to an aspect of the disclosure.

FIG. 4 illustrates the hub 13 allowing the front axle 51 to turn left. Note that the left front wheel 52 now retrieves into a space under the front half of the looped-in area of the lower frame 2. In other words, this particular design provides a lower profile floor of the enclosure without restricting the movement of the front wheels 52 and front axle 51. This can be accomplished by having a floor that is higher in the front end and lower in the rear end (see FIG. 7).

Also notable is the joint 1333 being disposed in a forwardly extended position such that the pivoting axis of the pull bar 7 is beyond the front axle 51. In other embodiments, the pivoting axis of the pull bar 7 is beyond the front-most surface of the hub 13. The forwardly disposed pivoting axis can prevent the pull bar 7 from pitching a child's finger when the pull bar 7 is folded against the hub 13.

Figure 5:
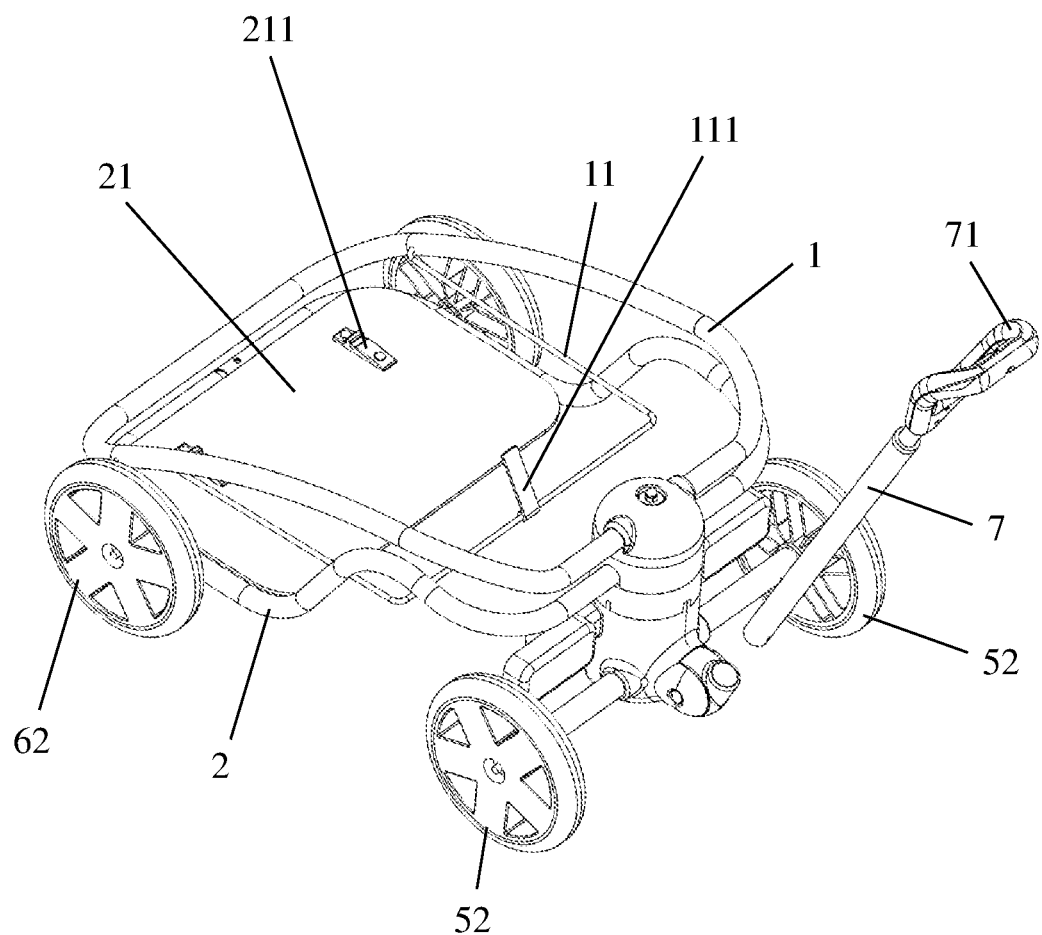
FIG. 5 is a perspective view of an embodiment of the pull wagon of FIG. 1 with the upper frame folded onto the lower frame to create a collapsed configuration, according to an aspect of the disclosure.
Figure 6:
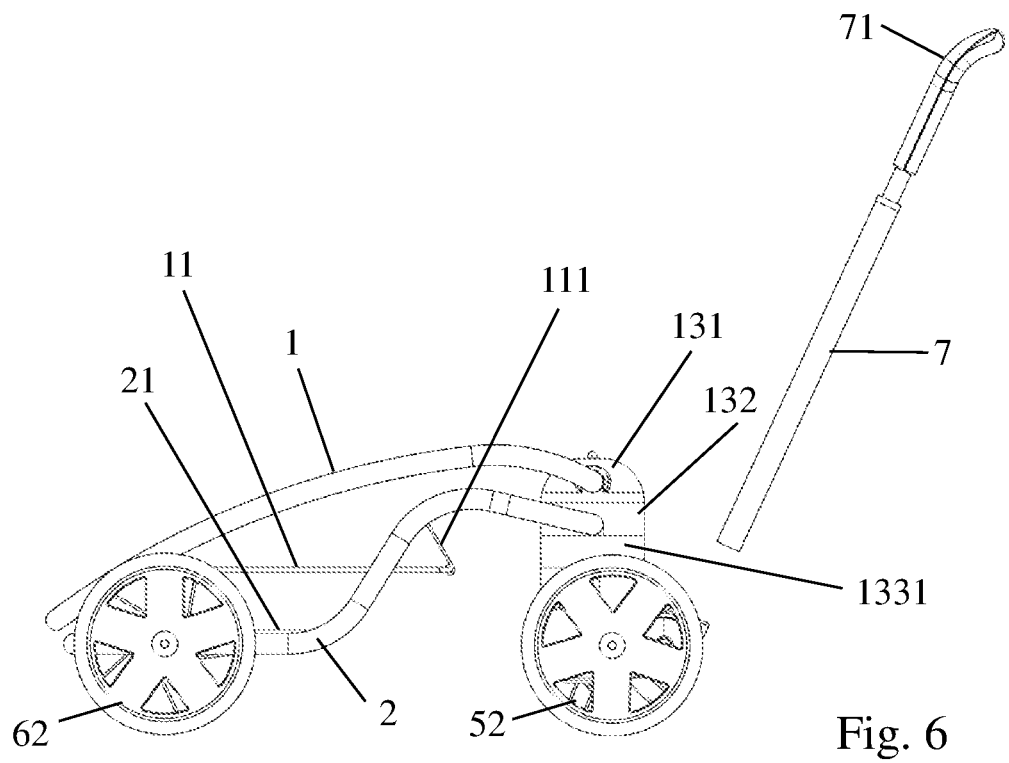
FIG. 6 is a side view of the pull wagon of FIG. 5 with the pull bar disassembled, according to an aspect of the disclosure.

When the releasable support frame 11 is detached from the fastener 211 as shown in FIGS. 5 and 6, the upper frame 1 can fold onto the lower frame 2. In the side view of the collapsed configuration provided in FIG. 6, the curved lower frame 2 allows some height of enclosure wall to remain in the rear half of the looped-in area of the lower frame 2. In other words, in this particular embodiment, the collapsed configuration can maintain a sizeable enclosure in the rear half of the expanded enclosure. The curved lower frame 2 essentially offers a step-down or step-up floor of the enclosure. When the upper frame 1 is fully collapsed unto the lower frame 2, the front "step-up" region loses some of its wall height from an expanded configuration, while the "step-down" region also loses some of its wall height from an expanded configuration. In some embodiments, when the upper frame 1 is fully collapsed unto the lower frame 2, the front "step-up" region loses about half of its wall height from an expanded configuration. In some embodiments, when the upper frame 1 is fully collapsed unto the lower frame 2, the front "step-down" region loses about half of its wall height from an expanded configuration.

In some embodiments, in an expanded configuration, the upper frame 1 is not horizontally level. As shown in FIG. 7, the upper frame 1 can slant downward towards the front. The slant can have a downward curve. The curved upper frame 1 is not connected to any other support structure except to the hub 13 and the releasable support frame 11, as discussed earlier for one particular embodiment.

In operation, a child can use the contemplated wagon and be able to reach into the enclosure over the front wall. This is made possible by having a front wall substantially lower than the rest of the walls. The front end having a shorter wall also minimizes the risk of a child tipping into the enclosure head-first and not being able to climb out of the enclosure. This is made possible by having a short front wall in combination with a relatively higher front floor.

In other embodiments, in an expanded configuration, the lower frame 2 is not horizontally level. As shown in FIG. 7, the lower frame 1 can slant upward towards the front. The slant can have an upward curve. As shown in FIG. 7, it can first slant upward towards the front and then slant downward, creating an "S" shape from a side view. The curved frame 2 is not directly connected to any part of the upper frame 1, according to one aspect of the disclosure. Other embodiments provide that the lower frame 2 is not directly connected to the front axle 52.

In FIGS. 8A-8D, various view of an expanded configuration is provided, according to one aspect of the embodiments. In an expanded configuration, the upper frame 1 provides an upper perimeter of the enclosure wall that slants toward the front. As discussed earlier and shown in FIG. 8A, the front wall can be lower than the rear wall of the enclosure. In some embodiments, the front wall is at a vertical height about half of the rear wall in an expanded configuration.

The various parts disclosed herein can be made of suitable materials to withstand abuse, such materials include natural and synthetic polymers, various metals, and metal alloys, naturally occurring materials, textile fibers, and all reasonable combinations thereof.

Thus, specific embodiments and applications of a children's pull wagon have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C and N, the text should be interpreted as requiring at least one element from the group which includes N, not A plus N, or B plus N, etc.

What is claimed is:

1. A children's pull wagon comprising:
a hub having a steering mechanism;
an upper frame having a front end pivotably coupled to the hub;
a lower frame coupled to the hub;
a set of front wheels connected by a front axle;
a set of rear wheels connected by a rear axle;
a pull bar coupled to the steering mechanism;
wherein the steering mechanism is coupled to the front axle;
wherein the hub is non-detachably coupled to the steering mechanism and the front axle; and
wherein the upper frame can pivot unto the lower frame to form a collapsed profile.

2. The children's pull wagon as recited in claim 1 further comprising a platform fixedly coupled to the lower frame.

3. The children's pull wagon as recited in claim 2 further comprising a support frame having a top end and a bottom end, the top end of the support frame is pivotably coupled to the upper frame at or near a rear end of the upper frame, wherein the bottom end of the support frame is releasably coupled to the platform.

4. The children's pull wagon as recited in claim 3, wherein the bottom end of the support frame is releasably coupled to a top side of the platform via at least one fastener.

5. The children's pull wagon as recited in claim 4, wherein the support frame has a U-shape, the support frame couples to the platform to form an expanded configuration, and the support frame releases from the platform thereby allowing the top frame to pivot unto the lower frame, forming said collapsed configuration.

6. The children's pull wagon as recited in claim 5 wherein the pull bar is pivotably coupled to the hub via a joint.

7. The children's pull wagon as recited in claim 6 further comprising a rotator rotatably coupled to the hub, wherein the front axle is partially disposed through the rotator.

8. The children's pull wagon as recited in claim 7, wherein the joint is pivotably disposed on the rotator, and the pull bar has a telescoping body.

9. A collapsible pull wagon comprising:
an upper loop frame having a front end;
a lower loop frame having a front end;
a hub;
a pull bar coupled to the hub;
a front axle non-detachably connected to the hub and is capable of rotating along a vertical axis of the hub;
two front wheels respectively disposed on a first and a second terminal ends of the front axle;
a rear axle coupled to the lower frame;
two rear wheels respectively disposed on a first and a second terminal ends of the rear axle;
wherein the front end of the upper loop frame is pivotably coupled the front end of the lower loop frame.

10. The collapsible pull wagon as recited in claim 9 wherein a portion of the front end of the upper loop frame is disposed through the hub, and a portion of the front end of the lower loop frame is disposed through the hub.

11. The collapsible pull wagon as recited in claim 9 furthering comprising a platform disposed on the lower loop frame.

12. The collapsible pull wagon as recited in claim 11, wherein the platform occupies substantially the rear-half of the bottom loop frame.

13. The collapsible pull wagon as recited in claim 11 further comprising a support frame pivotably connected to near a rear end of the top loop frame.

14. The collapsible pull wagon as recited in claim 13, wherein the support frame is releasably connected to the platform via a quick-release fastener.

15. The collapsible pull wagon as recited in claim 11, wherein the platform is disposed at a height substantially the same as a height of the rear axle.

* * * * *